United States Patent [19]
Emmons
[11] 3,842,312
[45] Oct. 15, 1974

[54] METHOD OF MODULATING A BEAM OF ELECTROMAGNETIC RADIATION

[75] Inventor: Lawrence D. Emmons, Santa Clara, Calif.
[73] Assignee: Ampex Corporation, Redwood City, Calif.

[22] Filed: June 26, 1972
[21] Appl. No.: 266,180

Related U.S. Application Data

[62] Division of Ser. No. 800,990, Feb. 20, 1969, Pat. No. 3,745,408.

[52] U.S. Cl. .................................................. 315/30
[51] Int. Cl. ............................................ H01j 29/52
[58] Field of Search ........... 315/30; 332/9; 325/142

[56] References Cited

UNITED STATES PATENTS

| | | | |
|---|---|---|---|
| 2,602,909 | 7/1952 | Reiches | 315/30 |
| 3,130,346 | 4/1964 | Callick | 315/30 |
| 3,277,335 | 10/1966 | Moser et al. | 315/30 |
| 3,708,716 | 2/1973 | Berwin | 315/30 |

FOREIGN PATENTS OR APPLICATIONS

| | | |
|---|---|---|
| 467,049 | 6/1936 | Great Britain |
| 635,562 | 4/1950 | Great Britain |
| 385,958 | 4/1931 | Great Britain |
| 317,778 | 2/1929 | Great Britain |

*Primary Examiner*—Maynard R. Wilbur
*Assistant Examiner*—H. A. Birmiel

[57] ABSTRACT

Image intelligence signals transmitted through a transmission path having a particular transfer characteristic for processing and subsequent display are converted to a pulse width modulated signal. In the conversion, the widths of the pulses are varied in a selected functional relation as the image intelligence signal strength. The functional relation is selected to produce a transfer characteristic which is compensatingly matched to that of the other parts of the signal transmission path. The pulse width modulated image intelligence signal is coupled to switch a transducing beam between selected high and low intensity levels at the rate of the pulse width modulated image intelligence signal. The transducing beam is maintained at one of the selected intensity levels for the duration of the width of the pulses and at the other level for the interval between consecutive pulses.

3 Claims, 11 Drawing Figures

METHOD OF MODULATING A BEAM OF ELECTROMAGNETIC RADIATION

This is a division of application Ser. No. 800,990, filed Feb. 20, 1969, now U.S. Pat. No. 3,745,408.

FIELD OF THE INVENTION

The present invention relates to transducing intelligence signals onto electromagnetic radiation transducing beams. More particularly, it relates to a technique of modulating the transducing beam with intelligence modulated signals. Electromagnetic radiation is used herein in the accepted scientific sense to mean moving nuclear particles as well as radiation at all frequencies commonly classified as radio frequency and microwave frequency, Hertzian, infrared, visible, ultraviolet, x-rays and γ-rays.

BACKGROUND OF THE INVENTION

Heretofore, intelligence signals have been transduced for display, temporary and permanent store, and reproduction by an electromagnetic radiation beam whose intensity is modulated directly in accordance with the variations in the strength of intelligence signals. For example, in oscilloscopes, electrostatic printers, television display monitors and similar display devices, images of intelligence signals are produced by varying the beam current of a cathode ray tube in accordance with variations in the intelligence signal. Because the transfer characteristic, i.e., beam intensity versus intensity control signal or Gamma, of transducing electromagnetic radiation beam generators generally is not linear, the beam intensity of the transducing beams generated thereby does not vary linearly with variations in the intelligence signal being transduced. When employing the electron beam generated by a cathode ray tube to transduce intelligence signals, its nonlinear Gamma characteristic, i.e., beam current versus grid-to-cathode voltage, is compensated by designing the analog cathode ray tube driver to have a matched compensating Gamma Correction characteristic. This is done in order to obtain a linearly varying relationship between the tube's transducing beam current and the input modulating intelligence signal whereby the transducing beam is able to faithfully produce at its output a representation of the input intelligence signal. If the compensating Gamma Correction characteristic is not properly matched to the nonlinear transfer characteristic of the tube, the beam tube will not faithfully produce the input intelligence signal. Consequently, even if the analog cathode ray tube driver is provided initially with the proper Gamma Correction characteristic, changes in the nonlinearity characteristic of analog driver will prevent the faithful production at the beam generator output of the input intelligence signal.

As discussed above, the faithful beam transducing of intelligence signals depends upon the linearity of the transfer function of the transmission path through a system component. Furthermore, faithful beam transducing requires that the system components of the entire transducing system including the intelligence signal generator, intelligence signal processor, drive unit for the beam transducer and the beam transducer itself have transfer characteristics such that the net transfer characteristic of the entire transducing system is linear. Since various ones of the system components often have nonlinear transfer characteristics, compensating system Gamma Correction generally must be introduced into the system at some point in order that the net transfer characteristic of the system is made linear. To facilitate system Gamma Correction, it is desirable to perform the compensating Gamma Correction at or near the output or beam transducing end of the system. However, because the prior art beam transducers have nonlinear transfer characteristics, rather elaborate means are required to perform system compensating Gamma Corrections at the output end of the transducing system. Furthermore, once a compensating Gamma Correction characteristic has been provided in the prior art transducing systems, it is only with considerable difficulty and through the use of rather complex circuitry that the compensating Gamma Correction characteristic can be changed to, for example, account for changes in the overall system's net transfer characteristic.

In intelligence transducing systems employing cathode ray tube type transducing beam generators, the inherent nonlinear transfer characteristics of the associated system components has complicated coupling of the intelligence signals to modulate the transducing beam without distroying the net linear transfer characteristic of the overall intelligence transducing system. Problems of preserving the systems net linear transfer characteristic are particularly troublesome when it is desired to operate the cathode ray tube generating the transducing beam with a depressed cathode. In the prior art, cathode ray tube type transducing beam generators have been able to operate with a depressed cathode without destroying the net linear transfer characteristic of the overall system only through the use of relatively elaborate and rather complex circuitry for coupling the intelligence signal to the driver of the depressed cathode of the cathode ray tube.

Therefore, considerable advantage is to be gained by intelligence modulating a transducing beam of electromagnetic radiation so that the transduced output provided by the transducing beam is independent of the Gamma transfer characteristic of the transducing beam generator. Additional advantages are to be gained by intelligence modulating a transducing beam of electromagnetic radiation so that Gamma transfer characteristic of the transducing beam generator compensatingly matches the combined transfer characteristic of the other system components thereby serving as the compensating Gamma Correction characteristic of the overall transducing system.

SUMMARY OF THE INVENTION

Accordingly, it is an object of the present invention to operate intelligence transducing electromagnetic radiation beam generators so that their transduced outputs are independent of the Gamma transfer characteristic of the transducing beam generator.

More particularly, it is an object of the present invention to intelligence modulate a beam of electromagnetic radiation for transducing intelligence signals in such a manner that the transfer characteristic of the transducing beam is independent of the Gamma transfer characteristic of the transducing electromagnetic radiation beam generator.

Another object of the present invention is to compensate the net transfer characteristic of an electromagnetic radiation beam type intelligence transducing system at the input of a transducing beam generator system component.

A further object of the present invention is to compensate the net transfer characteristic of an electromagnetic radiation beam type intelligence transducing system whose net transfer characteristic at the input of the transducing beam generator's intelligence signal processing system component is nonlinear by introducing a compensating Gamma Correction characteristic at the beam generator's intelligence signal processing system component.

Yet another object of the present invention is to perform compensating Gamma Correction in a manner which facilitates changing the Gamma Correction characteristic.

Still a further object of the present invention is to intelligence modulate a beam of electromagnetic radiation for transducing intelligence signals in a manner such that the transfer characteristic of the beam transducer is linear over the entire modulating range.

It is a further object of the present invention to intelligence modulate a beam of electromagnetic radiation for transducing intelligence signals in a manner which maintains the intensity of the beam constant.

Yet it is another object of the present invention to intelligence modulate a beam of electromagnetic radiation for transducing intelligence signals in a manner which allows adjusting the dynamic transducing range of the beam transducer to discriminatingly transduce weak and strong intelligence signals without changing the intensity of the transducing beam.

It is still a further object of the present invention to intelligence modulate a beam of electromagnetic radiation in the form of a stream of electrons provided by a cathode ray tube for transducing intelligence signals in a manner which facilitates coupling the modulating intelligence signal to the cathode ray tube.

Yet it is still another object of the present invention to intelligence modulate a beam of electromagnetic radiation for transducing intelligence signals by modulating the average intensity of the transducing beam without changing the peak intensity of the transducing beam.

Still it is yet a further object of the present invention to faithfully transduce magnetically stored video signals representative of a particular document image onto copy sheets of a printing mechanism.

In accordance with the present invention, intelligence signals are transduced onto intelligence carrying media by modulating the intensity of a transducing beam of electromagnetic radiation with pulse width modulated intelligence signals. The pulse width modulated intelligence signal is coupled to the transducing beam generator to switch the transducing beam generated thereby between selected high and low intensity levels at the rate of the pulse width modulated intelligence signal. The transducing beam is maintained at one of the selected intensity levels for the duration of the width of the pulses forming the pulse width modulated intelligence signal, and at the other level for the interval between consecutive pulses. One of the intensity levels of the transducing beam is selected as the intelligence transducing state of the beam. Thus, the transducing beam carries the intelligence to be transduced as equal intensity level pulses of electromagnetic radiation having a duty cycle which varies as a function of the strength of the intelligence signal being transduced. Hence, while the average intensity of the transducing beam of electromagnetic radiation is varied in accordance with the strength of the intelligence signal being transduced, the intelligence transducing intensity level of the beam is maintained constant. In this manner, the transfer characteristic of the transducing beam of electromagnetic radiation is made independent of the Gamma transfer characteristic of the transducing electromagnetic radiation beam generator.

Pulse width modulated signals can be formed directly or converted to that form from other forms of pulse time modulated signals. Time modulated signals carry intelligence in the form of the interval between signal state transitions. Commonly, this is either in the form of the interval between positive and negative going edges or duration of a pulse, or in the form of the interval between trigger-like pulses. Hence, when transferring the time modulated intelligence signal from the intelligence signal processing system component to the transducing beam generator's driver system component, the coupling system component need only preserve the relative times of the signal state transitions of the time modulated signals such as, for example, the positive and negative going edges of a pulse width modulated intelligence signal. Hence, even if the coupling system component does not linearly transfer the amplitude characteristic of the time modulated intelligence signal, the intelligence will be preserved if relative times of the signal state transitions of the time modulated intelligence signal are linearly transferred. Since the system component coupling the time modulated intelligence signal need only linearly transfer the relative time positions of its signal state transitions, the system component coupling the intelligence signal processing system component to the beam generator's driver system component requires far simpler circuitry than those associated with the prior art beam transducing systems wherein it is necessary to linearly transfer both the amplitude and time characteristic of the intelligence carrying signal used to modulate the transducing beam's intensity.

Since the faithful reproduction of intelligence signals is independent of the Gamma transfer characteristic of the transducing beam generator and can easily be made independent of the transfer characteristic of the driver-to-generator coupling system component, a compensating Gamma Correction characteristic for the entire transducing system can be introduced and made easily adjustable at the time modulator system component. Compensating Gamma Correction is provided by nonlinearly varying the interval between signal state transitions in accordance with the intelligence signal to obtain the functional relationship required to compensatingly match its transfer characteristic to the net transfer characteristic of the feeding system components. To adjust the compensating Gamma Correction to, for example, account for changes in the net transfer characteristic of the other system components, it is only necessary to adjust compensatingly the time modulation transfer characteristic.

In addition to the foregoing advantages accruing to the intelligence transducing beam modulation technique of the present invention, the technique of the present invention facilitates adjusting the dynamic transducing range of intelligence beam transducers whereby both weak and strong intelligence signals can be discriminately transduced without changing the intensity of the transducing beam. If weak intelligence signals are to be discriminately transduced, the intelligence signal modulator is adjusted to provide a maximum interval between two consecutive signal state transitions when the strength of the intelligence signal is at a selected maximum weak level. If stronger intelligence signals are to be transduced, the intelligence signal modulator is adjusted to provide a maximum time interval between two consecutive signal state transitions when the strength of the intelligence signals is at higher levels. The intelligence signal modulator also can be arranged for transducing intelligence signals having strengths lying within a preselected range.

BRIEF DESCRIPTION OF THE DRAWINGS

The foregoing and other advantages and features of the present invention will become more apparent from the following description and claims considered together with the accompanying drawings of which:

DESCRIPTION OF THE PREFERRED EMBODIMENTS

Figures 1, 2:
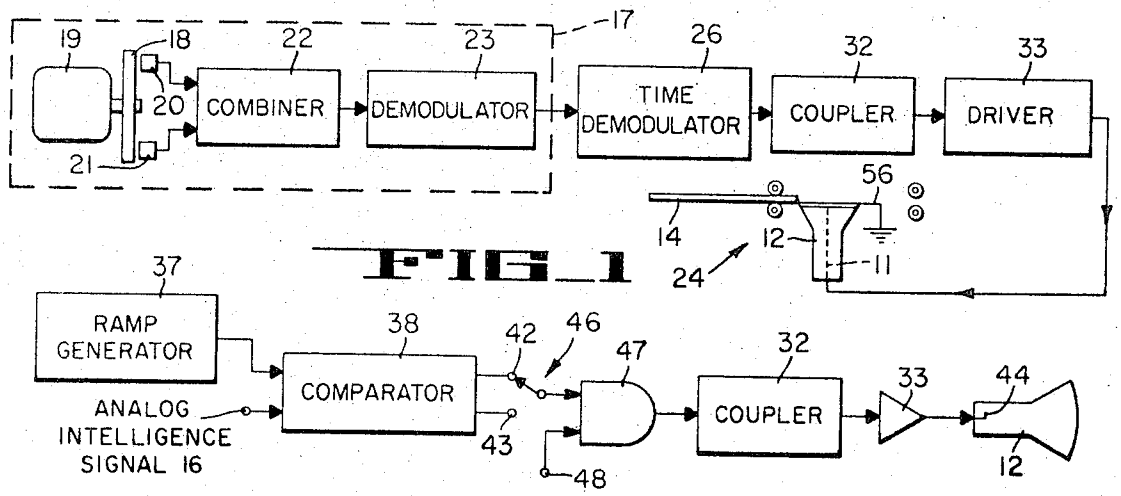
FIG. 1 is a schematic block diagram of a facsimile receiver for transducing a facsimile intelligence signal into a reproduced image.
FIG. 2 is a schematic block diagram of a pulse width modulating type time modulator coupled to drive a cathode ray tube type electromagnetic radiation transducing beam generator.

Referring to FIG. 1, in accordance with the present invention the intensity of a transducing beam of electromagnetic radiation 11 provided by a beam generator 12 is modulated with a pulse width modulated intelligence signal 13 (see FIG. 3) to reproduce on an intelligence displaying medium 14 the intelligence signal 16 (see FIG. 3) received from a source 17. In the particular embodiment illustrated, each single frame video document image intelligence signal, recorded as varying states of magnetization along magnetic tracks of a magnetic disc 18 rotated by a drive motor 19, is transduced to its corresponding electrical form by a pair of magnetic heads 20 and 21. The magnetic heads 20 and 21 are coupled to a video signal combiner 22 which combines the portion of the single video signals received therefrom to provide a single frame composite video signal. A video demodulator 23 separates the document image intelligence signal 13 from the composite video signal which in turn is coupled to modulate the current of an electron beam type electromagnetic radiation beam 11 of a line scan cathode ray tube type beam generator 12 of an electrostatic printer type facsimile recorder 24 whereby the document image carried by the video intelligence signal is transduced onto the intelligence display medium or sensitized copy sheets 14. The details of an electrostatic printer 24 for providing copies of document images from document image video intelligence signals recorded on a magnetic disc 18 is described in my copending U.S. Pat. application Ser. No. 800,954, filed on Feb. 20, 1969, and entitled "Maintaining Spacing Between Sheets From And Onto Which Document Images Are Transduced", now U.S. Pat. No. 3,665,099.

Although the transducing beam modulator technique of the present invention is described in detail as employed to modulate the current of an electron beam 11 generated by a cathode ray tube 12 to transduce document image video intelligence signals provided a magnetic storage medium source 17 onto copy sheets 14 of an electrostatic printer 24, such a system was selected only for illustrative purposes. The beam modulating technique of the present invention can be employed in any circumstance where the intensity of a beam of electromagnetic radiation 11 is to be modulated with an intelligence bearing signal 13 for transducing purposes.

Figure 3:
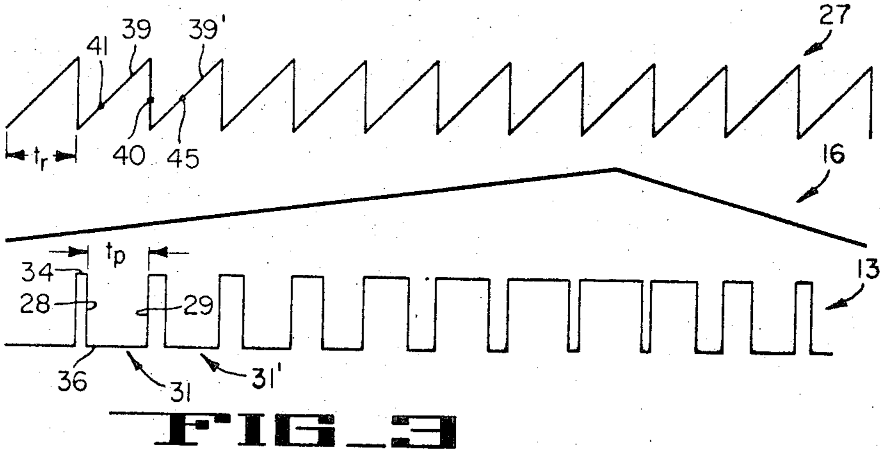
FIG. 3 is a graphical representation of waveforms illustrating the operation of the pulse width modulator of FIG. 2.

Considering the beam modulating technique of the present invention in more detail, the document image intelligence signal 13 received from the intelligence signal source 17 is coupled to a pulse-type time modulator 26. The pulse-type time modulator 26 provides a reference signal 27 (see FIG. 3) against which the intelligence signal operates to cause the modulator 26 to issue a modulated signal, such as, the pulse width modulated intelligence signal 13, which carries the intelligence in the form of an interval, $t_p$, (see FIG. 3) between signal state transitions 28 and 29 (see FIG. 3). The signal state transitions 28 and 29 may be in the form of negative going and positive going edges, or duration, of a pulse 31 as illustrated in FIG. 3. Alternatively, for reasons that will become more apparent from the description of the operation of coupling means 32 in transferring the modulated intelligence signal from the time modulator 26 to the electromagnetic radiation beam generator driver 33, the signal state transitions 28 and 29 may be in the form of an interval between trigger-like pulses.

The time modulator 26 can be arranged so that the interval, $t_p$, between signal state transitions 28 and 29 varies linearly with the modulating intelligence signal 16. In this mode of operation, the transfer characteristic of the time modulator 26 is linear. However, if some relationship other than linearity is desired to exist between the interval, $t_p$, and the modulating intelligence signal 16, as where it is desired to provide a Gamma Correction characteristic at the time modulator 26, the time modulator 26 can be arranged to provide the desired functional relationship between the interval, $t_p$, and the modulating intelligence signal 16.

The time modulated intelligence signal provided by the time modulator 26 is coupled by the coupling means 32 to provide the pulse width modulated intelligence signal 13 to the beam generator driver 33. Since the time modulated intelligence signal provided by the time modulator 22 carries the intelligence as the interval, $t_p$, separating signal state transitions 28 and 29, it is necessary only that the transfer characteristic of the coupling means 32 be such that the relative times of the signal state transitions 28 and 29 are not changed during their transmission through the coupling means 32.

The pulse width modulated intelligence signal 13 output by the coupling means 32 is in the form of a train of two state pulses 31 which switch between a high state 34 and a low state 36 (see FIG. 3) at the rate of the signal state transitions 28 and 29. The pulse width modulated intelligence signal 13 is coupled to the beam generator's driver 33. The driver 33 prepares the pulse width modulated intelligence signal 13 for application to the beam generator 12 to control the intensity of the beam 11 of electromagnetic radiation generated thereby. The prepared pulse width modulated intelligence signal is coupled to the beam generator 12 to switch the intensity of the beam 11 between selected high and low intensity levels at the rate of the signal state transitions 28 and 29, hence, of the pulse width modulated intelligence signal 13. The beam 11 is maintained at one of the intensity levels for the durations of the pulses 31 and at the other level for the interval, $t_p$, between consecutive pulses 31 and 31'. One of the signal levels 34 and 36, hence intensity levels of the transducing beam, is selected as the intelligence transducing state of the beam. Thus, the transducing beam 11 of electromagnetic radiation carries the intelligence to be transduced as equal intensity level pulses of electromagnetic radiation having a duty cycle which varies as a function of the strength of the intelligence signal 16 being transduced.

While the average intensity of the transducing beam 11 varies in accordance with the variation of the width of the pulses forming the pulse width modulated intelligence signal 13, hence, the strength of the intelligence signal 16 being transduced, the intelligence transducing intensity level of the beam 11 remains constant. Hence, the transfer characteristic of the transducing beam 11 is independent of the Gamma transfer characteristic of the transducing electromagnetic radiation beam generator 12.

Referring now to FIGS. 2 and 3, a pulse width modulating type of time modulator 26 is shown for converting an analog video intelligence signal 16 to a pulse width modulated intelligence signal 13 that is coupled to modulate the current of a transducing electron beam 11 generated by a cathode ray tube 12. To form a pulse width modulated intelligence signal 13 of pulses 31 whose interval varies linearly as the amplitude of the incoming analog intelligence signal 16, a linear time-base generator 37 is operated to provide a linear time-base varying reference signal waveform 27 such as a linear sawtooth or ramp of voltage. A voltage comparator 38, such as, a linear difference amplifier type voltage comparator, is coupled to receive the linear voltage ramp reference signal 27 at the input of one of the sections of the difference amplifier comparator 38. The input of the other section of the difference amplifier comparator 38 is coupled to receive the analog intelligence signal 13. As each voltage ramp 39 of the linearly varying voltage ramp reference signal 27 is generated, the difference amplifier comparator 38 causes its output to execute a signal state transition, for example, from the high level signal level 34 to low signal level 36, when the voltage ramp 39 attains the voltage level 41 of the incoming analog intelligence signal 13. The output of the difference amplifier comparator 38 remains in this low signal state level 36 for the remainder of the voltage ramp 39 until, at the termination of the voltage ramp 39, the linearly varying voltage ramp reference signal 27 returns to a voltage level 40 less than the voltage level of the incoming analog intelligence signal 13. When the voltage ramp 39 terminates and the reference signal 27 returns to the voltage level 40, the difference amplifiers comparator 38 causes its output to execute a signal state transition from low signal level 36 to the high signal level 34. Hence, the difference amplifier voltage comparator 38 issues an output pulse 31 during the generation of a voltage ramp 39 whose pulse width, hence, the interval, $t_p$, between consecutive pulses 31 and 31', is related to an instantaneous voltage level of the incoming analog intelligence signal 16 during the voltage ramp interval, $t_r$.

The output of the difference amplifier comparator 38 remains in this high signal state level 34 until, during the generation of the next voltage ramp 39', the voltage level 45 of the voltage ramp 39' attains the voltage level of the incoming analog intelligence signal 13 at which time the comparator 38 operates in the manner described above to issue another pulse 31' whose width is related to an instantaneous voltage level of the incoming analog intelligence signal 16 during the voltage ramp. Since the voltage ramps 39 of the reference signal 27 varies linearly with time to provide a linear time-base waveform 27, the time interval, $t_p$, between signal state transitions 28 and 29, or width of the pulses 31, will be linearly related to various instantaneous amplitudes of the incoming analog intelligence signal 16. In this manner, the voltage comparator 38 together with the linear time-base or ramp generator 37 provide the pulse width modulated intelligence signal 13 which carries the intelligence in the form of an interval, $t_p$, between negative and positive going edges 28 and 29 which are linearly related to instantaneous amplitudes of the incoming intelligence signal 16.

The output of each section of the difference amplifier comparator 38 is coupled to the output terminals 42 and 43. The output at the terminal 43 is an inverted form of the pulse width modulated intelligence signal 13 appearing at the terminal 42. If positive image forms of the intelligence signal 16 are to be transduced by, for example, modulating the current of an electron beam 11 generated by a cathode ray tube beam generator 12 at its cathode 44, the form of the pulse width modulated intelligence signal, carrying intelligence at the low signal level 36 and present at terminal 42, is coupled to modulate the current of the electron beam 11. On the other hand, if negative image forms of the intelligence signal 16 are desired, the output terminal 43 at which the inverted form of the pulse width modulated intelligence signal appearing at terminal 42 occurs is coupled to modulate the current of the electron beam 11. Whatever type of electromagnetic radiation beam 11 is employed to transduce intelligence signals and however the pulse width modulated intelligence signal is coupled to modulate the intensity of the beam, the invertedly related forms of the pulse width modulated intelligence signals appearing at the output terminals 42 and 43 of the voltage comparator will transduce positive and negative forms of the intelligence signal onto the transducing beam 11 of electromagnetic radiation.

A selector switch 46 couples one of the terminals, for example, in transducing positive intelligence signals, terminal 42 to a gate 47, hence, to the coupling means 32. The gate 47 is gated on at its input terminal 48 to allow the pulse width modulated intelligence signals 13 to be coupled to the coupling means 32 when transducing intelligence signals 16. When it is desired to terminate the beam transducing of intelligence signals 16, the gate 47 is set in its inhibit state by the input signal at the gate terminal 48.

The coupler 32 couples the pulse width modulated intelligence signal 13 to a driving means 33 which prepares the pulse width modulated intelligence signal 13 for application to the transducing beam generator 12 to switch the intensity level of the beam 11 between high and low intensity levels at the rate that the pulse width modulated intelligence signal 13 is switched between its low and high signal levels 36 and 34. The transducing beam 11 of electromagnetic radiation is in the form of bursts of uniform intensity electromagnetic radiation of a duration corresponding to the interval, $t_p$, or duty cycle of the pulses 31 forming the pulse width modulated intelligence signal 13 and at an average rate equal to the frequency of the voltage ramp generator 37. If positive forms of intelligence signals are to be transduced by he beam 11, the intelligence information is transduced by the beam on-time or high intensity bursts of electromagnetic radiation. If negative forms of intelligence signals are to be transduced, the intelligence information is transduced by the beam off-time or low intensity bursts of electromagnetic radiation.

Since the intelligence bearing intensity level of the transducing electromagnetic radiation beam 11 is constant, regardless of the width of the pulses 31 the transfer characteristic of the transducing beam 11 is independent of the beam generator's Gamma transfer characteristic. This most important feature of the transducing beam modulating technique of the present invention can be better understood with reference to FIG. 4. In electromagnetic radiation beam generators 12, generally, the intensity of the beam is related to the input intensity control signal by some nonlinear functional relationship. For example, cathode ray tube type beam generators 12 have a beam intensity or current, $I_b$, versus grid-to-cathode current control signal, $V_{jk}$, relationship in the form of FIG. 4. Hence, if the beam intensity is modulated by continuously varying the intensity control signal in accordance with the intelligence signal 16 to be transduced by the beam 11, as is commonly done in prior art intelligence signal transducing beam systems, the beam intensity will vary nonlinearly as the control signal.

However, in accordance with the beam modulating technique of the present invention, the beam intensity control signal, $V_{gk}$, is switched in accordance with the pulse width modulated intelligence signal between high and low signal states 34 and 36. This causes the beam intensity or current, $I_b$, to be switched between corresponding low and high current levels 49 and 51. Since the intelligence signal information is carried by the pulse width modulated intelligence signal 13 in the form of the duration that the signal 13 remains in the high and low signal states 34 and 31, the electromagnetic radiation beam 12 transduces the intelligence signal information in accordance with the duration that its intensity or current, $I_b$, is at corresponding low and high intensity levels 49 and 51 independent of the absolute intensity of the beam 11 at these levels. Hence, since the beam 11 transduces independently of its absolute intensity level, the beam 11 is able to transduce intelligence signals 16 independent of the beam generator's transfer or Gamma characteristic.

Figure 4:
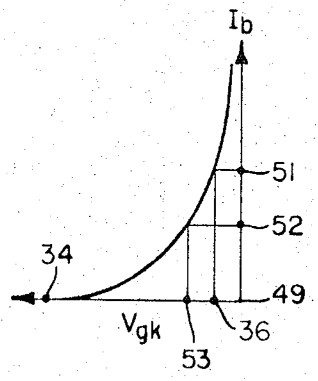
FIG. 4 is a graphical representation of the Gamma transfer characteristic of a cathode ray tube.

FIG. 4 illustrates the case where the amplitude of the pulses 31 are sufficient to switch the beam intensity level between a high on level 51 and a completely off level 49. However, since the beam 11 transduces intelligence signal information in the form of the relative durations that the intensity of the beam 11 remains at the high and low intensity levels 51 and 49, it is necessary only to switch the intensity level of the beam 11 between two distinct intensity levels. Therefore, the time modulator 26 and driver 33 can be arranged to provide a pulse width modulated intelligence signal 13 which switches the intensity of the beam 11 between two on levels, for example, 51 and 52, as the amplitude of the pulse width modulated intelligence signal is switched between the signal states 36 and 53.

To faithfully transduce the intelligence signal 16, the frequency of the time-base generator 37 should be many times greater than the highest expected intelligence signal frequency. In practice, it has been found that the intelligence signal can be faithfully produced when the frequency of the time-base generator's voltage ramp reference signal 27 is twice the highest expected intelligence signal frequency so that at least four signal state transitions are included in the time modulated signal. If the frequency of the voltage ramp reference signal 27 is greater than four times the highest expected intelligence signal frequency, a most accurate faithful transduction of the intelligence signal 16 is obtained.

Figure 5:
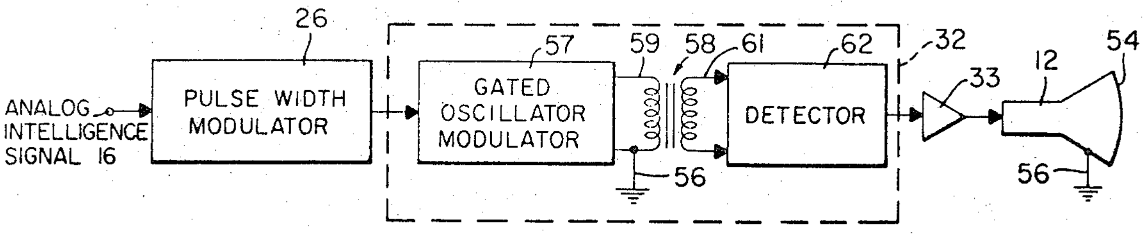
FIG. 5 is a schematic block diagram of one embodiment for coupling pulse width modulated intelligence signals to modulate the intensity of the transducing beam of electromagnetic radiation.
Figure 6:
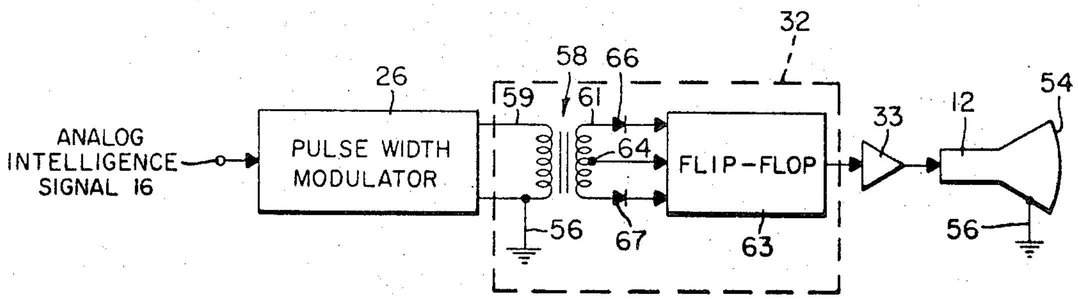
FIG. 6 is a schematic block of another embodiment for coupling pulse width modulated intelligence signals to modulate the intensity of the transducing beam.
Figure 7:
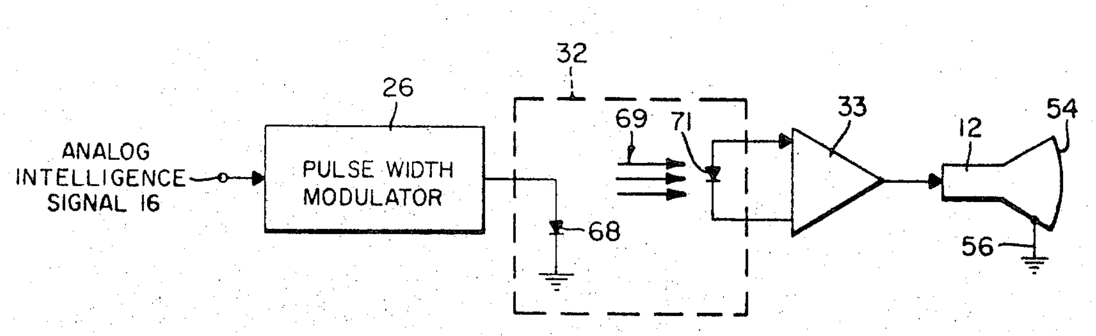
FIG. 7 is a schematic block diagram of another embodiment for coupling pulse width modulated intelligence signals to modulate the intensity of the transducing beam.

As discussed hereinbefore, the beam modulation technique of the present invention also facilitates coupling of the beam modulation signal to a depressed cathode operated cathode ray tube type beam transducer 12. Referring to FIGS. 5 through 7 inclusive, various coupling means 32 are shown whereby a low voltage beam modulation signal is coupled across a high potential difference, commonly, on the order of tens of thousand volts, to the cathode 44 of the cathode ray tube 12 operated at tens of thousand volts negative with respect to the screen 54 of the tube 11 which is at ground 56. In FIG. 5, the pulse width modulated intelligence signal 13 provided by the modulator 26 is coupled to the input of a gated high frequency oscillator 57 to pulse modulate the high-frequency carrier signal generated by the oscillator 57 the pulse modulated carrier signal is transformer coupled by a transformer 58 having a grounded primary 59 and a floating secondary 61 at a potential on the order of the cathode potential to the input of a radio frequency detector 62. The radio frequency detector 62 removes the pulse width modulated intelligence signal 13 from the high-frequency carrier, and the pulse width modulated intelligence signal 13 is coupled to the driver 33 for modulating the current of the transducing beam 11 in the manner described hereinbefore with reference to FIGS. 2 through 4 inclusive.

FIG. 6 illustrates an embodiment of the coupling means 32 wherein the pulse width modulated intelligence signal 13 porvided by the modulator 26 is coupled directly to the primary 59 of the transformer 58 for transformer coupling to the high voltage secondary 61. Because of the differentiating characteristic of transformer coupling, the pulse width modulated intelligence signal 13 is converted by the action of the transformer 58 to alternating positive and negative going trigger pulses coinciding with the positive and negative going signal state transitions 29 and 28 of the pulse width modulated intelligence signal 13. To convert the time position modulated trigger pulse form of the modulated intelligence signal 13 back to the pulse width modulated form, a bistable flip-flop 63 is referenced to a center tap 64 of the secondary 61. A first steering diode 66 is connected between one side of the secondary 61 and the input of one section of the bistable flip-flop 63. A second similarly poled steering diode 67 is connected between the other side of the secondary 61 and the input of the other section of the bistable flip-flop 63. Hence, as alternate positive and negative going trigger pulses appear across the secondary 61 of the transformer 58, the flip-flop 63 is alternately switched between its stable conducting states. Hence, the output of one of the sections of the bistable flip-flop 63 is a faithful reproduction of the pulse width modulated intelligence signal 13 appearing across the primary 59 of the transformer 58. As in the case of the embodiment of FIGS. 2 and 5, the reconstructed pulse width modulated intelligence signal 13 is coupled to the driver 33 for modulating the current of the transducing beam 11.

Referring to FIG. 7, a light transducing coupling means 32 is shown for coupling the low voltage pulse width modulated intelligence signal 13 to the high voltage cathode ray tube drive circuit. A light emitting semiconductor diode 68 is coupled to receive the pulse width modulated intelligence signal 13 generated by the modulator 26 and responsively generates pulse of light or other electromagnetic radiation 69 representative of a duration corresponding to the pulses 31 forming the pulse width modulated intelligence signal. A photodiode 71 is positioned to receive the pulse width modulated light 69 and responsively provide the corresponding electrical form, thereby, generating the pulse width modulated intelligence signal 13 at the high voltage cathode ray tube drive circuit. As in the case of the embodiments of FIGS. 2, 5 and 6, the reconstructed pulse width modulated intelligence signal 13 is coupled to the driver 33 for modulating the current of the transducing beam 11.

The transducing beam modulating technique of the present invention has thus far been described with reference to linearly varying the interval, $t_p$, between two consecutive signal state transitions in accordance with the intelligence signal 16 to be transduced. However, as described hereinbefore, the time base generator 37 can be arranged to provide a nonlinear timing waveform or voltage ramp reference signal, such as, the voltage ramp signal 72 of FIG. 8 or the voltage ramp signal 73 of FIG. 10, whereby the modulating signal is related by some functional relationship other than linear. Such a nonlinear functional relationship between the intelligence signal 16 and the timing-waveform reference signals 72 or 73, can be cmployed to provide compensating Gamma Correction for the entire transducing system. Furthermore, by adjusting the relative voltage levels of the intelligence signal 16 and the timing waveform, the dynamic intelligence signal transducing range can be adjusted.

Figure 8:
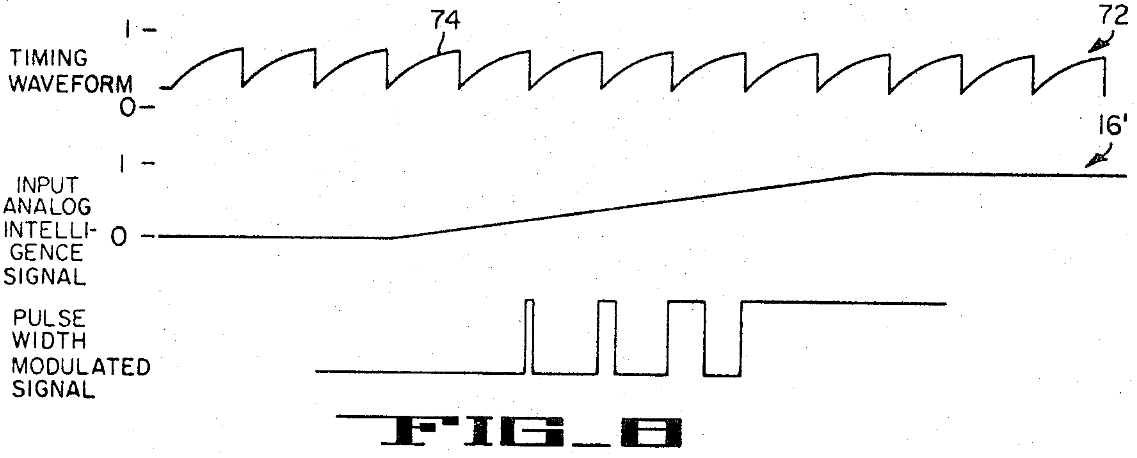
Fig. 8 is a graphical representation of waveforms illustrating the results of Gamma Correcting nonlinear operation of the pulse width modulator of FIG. 2 as arranged to discriminately transduce a range of intelligence signals.
Figures 9, 10:
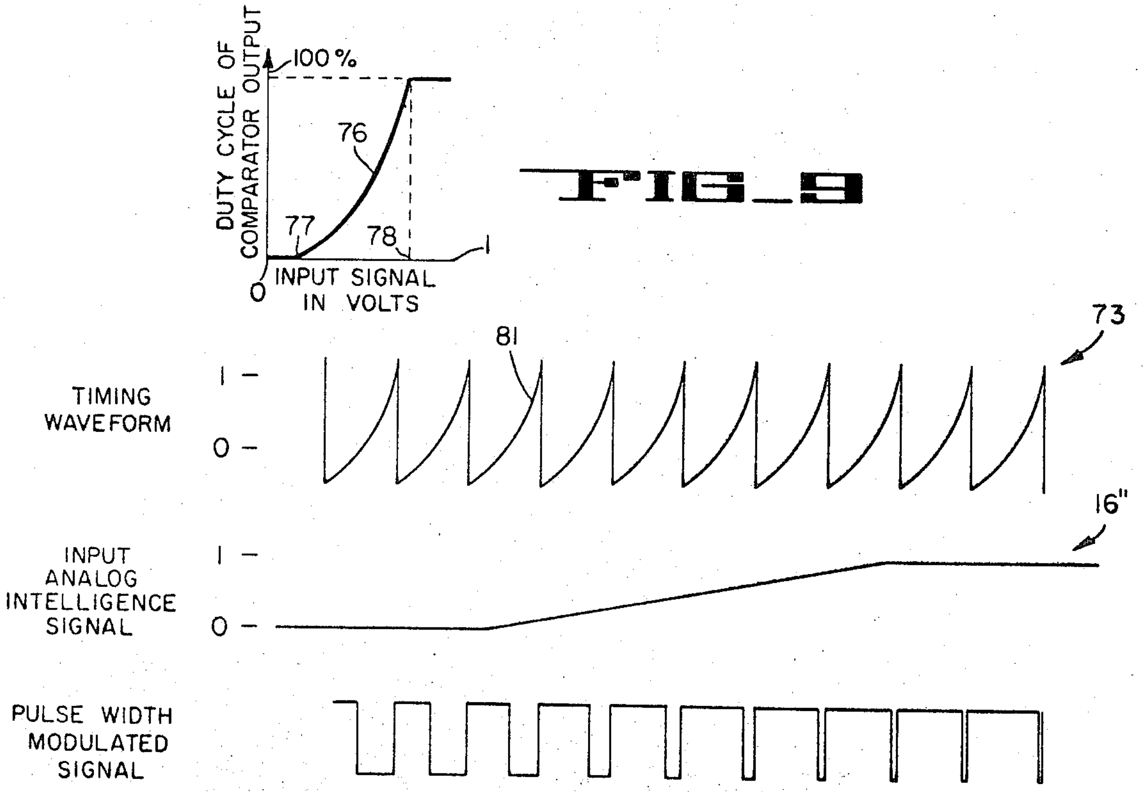
FIG. 9 is a graphical representation of the Gamma Correcting transfer characteristic of the pulse width modulator of FIG. 2 operated in accordance with the waveforms depicted in FIG. 8.
FIG. 10 is a graphical representation of waveforms illustrating the results of another Gamma Correcting nonlinear operation of the pulse width modulator of FIG. 2 is arranged to discriminately transduce all intelligence signals with a uniform background.

FIGS. 8 and 9 illustrate the case where the time-base waveform generator 37 provides convexingly nonlinear voltage ramps 74 having a peak-to-peak voltage less than the greatest peak-to-peak amplitude of the intelligence signal 16′ expected. Furthermore, the section of the differential amplifier voltage comparator 38 receiving the voltage ramps 74 is biased so that the minimum amplitude intelligence signal 16′ expected is less than the minimum absolute voltage of the voltage ramps 74 at the input of the section of the differential amplifiers comparator 38. Under the foregoing operating conditions, the pulse width modulator 26 has a transfer characteristic 76 represented in FIG. 9. Intelligence signals 16′ having amplitudes below the level 77 or above the level 78 will not be transferred by the pulse width modulator 26. Hence, when the beam modulation system is arranged in this manner, it discriminately transduces an amplitude range of intelligence signals.

Figure 11:
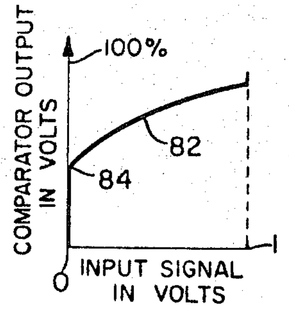
FIG. 11 is a graphical representation of the Gamma Correcting transfer characteristic of the pulse width modulator of FIG. 2 operated in accordance with the waveforms depicted in FIG. 10.

FIGS. 10 and 11 illustrate the case where the time-base waveform generator 37 provides concavingly nonlinear voltage ramps 81 having a peak-to-peak voltage greater than the greatest peak-to-peak amplitude intelligence signal 16″ expected. Furthermore, the section of the differential amplifier voltage comparator 38 receiving the voltage ramp 81 is biased so that its minimum absolute voltage is less than that of any intelligence signal 16″ received at the input of the section of the differential amplifier voltage comparator 38 to which it is coupled while its maximum absolute voltage is greater than that of any intelligence signal 16″ received. Under these conditions, the pulse width modulator 26 has a transfer characteristic 82 represented in FIG. 11. All intelligence signals 16″ are transferred by the pulse width modulator 26 in the presence of a uniform background represented by the output 84 provided by the comparator 38 when the intelligence signal amplitude is zero.

From the foregoing description, it should be appreciated that by pulse width modulating the intelligence signal to be transduced by a beam of electromagnetic radiation, many features of advantage are obtained heretofore not realizable. Although the technique of the present invention has been described as performed with a sawtooth type timing-waveform, any timing waveform can be employed which provides the desired functional relationship relative to the intelligence signal being transduced. For example, a triangular shaped timing waveform provides the same result as a sawtooth waveform except that the frequency of the triangular waveform time-base generator 37 must be twice that of a sawtooth waveform to enable transducing the same frequency range of intelligence signals.

I claim:

1. Method of modulating a beam of electromagnetic radiation for transducing intelligence signals including varying information related components transmitted through a transmission path having a particular transfer characteristic comprising the steps of generating a time modulated signal having spaced signal state transitions defining intervals which carry the intelligence signal information, varying the intervals in accordance with the varying information related component of the intelligence signal in a selected functional relation productive of a transfer characteristic which is compensatingly matched to that of the remainder of the transmission path, switching the intensity of the transducing beam alternately between two selected intensity levels at the occurrence of consecutive signal state transitions to thereby effect modulation of the transducing beam, and maintaining the intensity of the transducing beam at each of the two selected intensity levels for a time equal to the interval between the signal state transition at the occurrence of which the intensity of the transducing beam is switched to the selected intensity level and the following signal state transition.

2. The method according to claim 1 wherein the step of generating a time modulated signal includes generating a time modulated signal having spaced signal state transitions defining alternating first and second complementary intervals, and the step of varying the intervals includes complementally varying the said first and second intervals in accordance with the varying information related component of the intelligence signal in the said selected functional relation.

3. The method according to claim 2 wherein the step of generating a time modulated signal includes generating a pulse width modulated signal in the form of spaced pulses of durations defined by leading and trailing signal state transition edges, the step of varying the first and second intervals includes varying said durations in accordance with the varying information related component of the intelligence signal in the said selected functional relation, and the step of switching the intensity of the beam includes switching the intensity to one of the two selected intensity levels for the duration of each pulse of the pulse width modulated signal and to the other selected intensity level for the duration of each interval between the spaced pulses.

* * * * *